United States Patent
Khalid et al.

[11] Patent Number: 5,696,483
[45] Date of Patent: Dec. 9, 1997

[54] ILLUMINATING INDICATING APPARATUS

[75] Inventors: Syed Mohammed Khalid, Bloomfield Hills; Lev Abraham Fruitman, Southfield; Matthew Mark Mikolajczak, Novi, all of Mich.

[73] Assignee: Ford Motor Company, Dearborn, Mich.

[21] Appl. No.: 536,040

[22] Filed: Sep. 29, 1995

[51] Int. Cl.⁶ .................................................. B60Q 1/00
[52] U.S. Cl. .................. 340/456; 340/438; 340/815.45; 340/815.56; 116/28.1
[58] Field of Search ........................ 340/438, 456, 340/482, 483, 488, 815.45, 815.55, 815.56, 815.65, 815.66, 815.67; 74/473 R; 200/61.88, 61.91; 116/28.1, DIG. 5, DIG. 20, 202

[56] References Cited

U.S. PATENT DOCUMENTS

| | | | |
|---|---|---|---|
| 4,137,864 | 2/1979 | Lauper | 116/28.1 |
| 4,244,317 | 1/1981 | Rauch | 116/202 |
| 4,752,771 | 6/1988 | Katogi et al. | 340/815.67 |
| 4,785,615 | 11/1988 | Leigh-Monstevens | 60/534 |
| 4,804,268 | 2/1989 | Mohnsen et al. | 356/338 |
| 5,055,669 | 10/1991 | Blake et al. | 250/214 AL |
| 5,164,715 | 11/1992 | Kashiwabara et al. | 340/815.45 |
| 5,193,104 | 3/1993 | Bastie et al. | 378/73 |
| 5,206,519 | 4/1993 | Kirk | 116/28.1 |
| 5,245,313 | 9/1993 | Polityka | 340/456 |
| 5,398,018 | 3/1995 | Polityka | 340/456 |
| 5,404,133 | 4/1995 | Moriike et al. | 340/815.56 |
| 5,450,301 | 9/1995 | Waltz et al. | 340/815.65 |
| 5,504,661 | 4/1996 | Szpak | 340/815.56 |
| 5,512,875 | 4/1996 | Polityka | 340/456 |
| 5,555,161 | 9/1996 | Roe et al. | 116/28.1 |

FOREIGN PATENT DOCUMENTS

92/14629  9/1992  WIPO.

Primary Examiner—Thomas Mullen
Assistant Examiner—Timothy Edwards, Jr.
Attorney, Agent, or Firm—Paul K. Godwin

[57] ABSTRACT

An indicator (10) for providing a prominent and distinct indication of the selected operating mode among a plurality of selectable operating modes of an automatic transmission in a motor vehicle. The indicator (10) comprises a housing (70) with a plurality of indication compartments (82–92) which each communicate with an associated indicator window (152–162). An indicator light source (32–42) is disposed in each of the indication compartments (82–92). Light emitted by an illumination light source (56–60) disposed in an illumination compartment (104) passes through a light filter (106) to provide filtered light to the indication compartments (82–92).

5 Claims, 2 Drawing Sheets

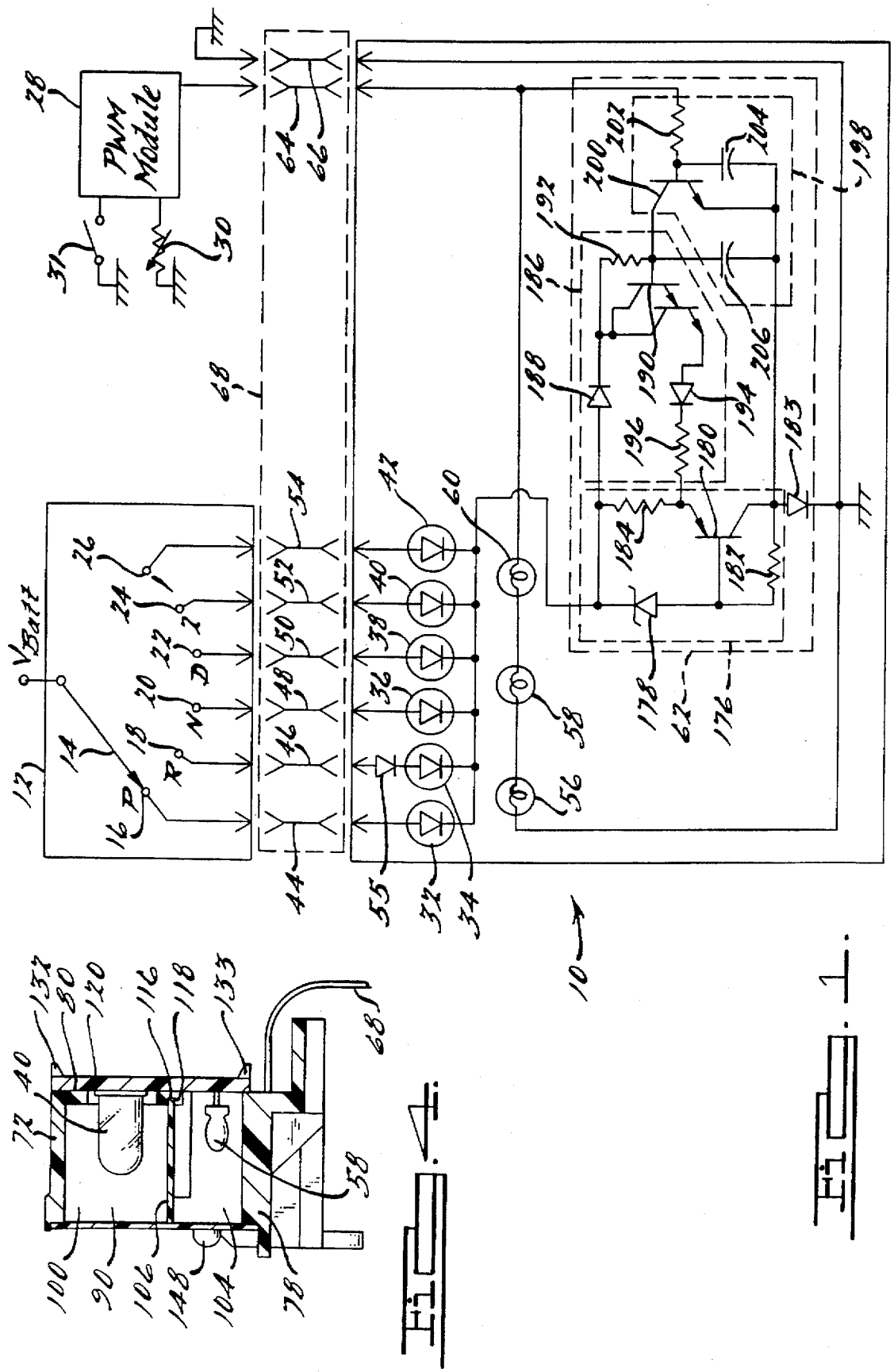

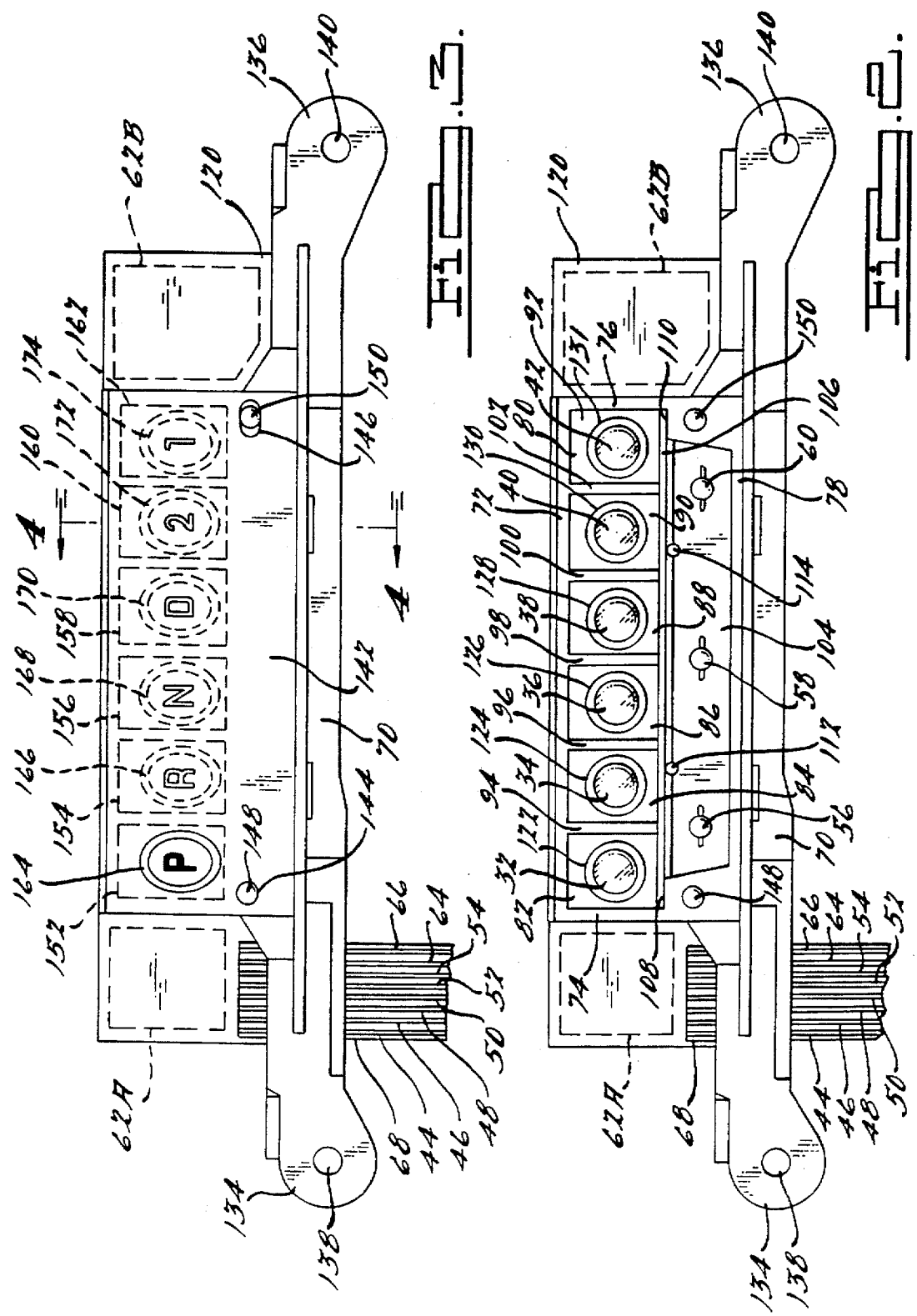

ILLUMINATING INDICATING APPARATUS

BACKGROUND OF THE INVENTION

The present invention relates generally to indicating devices, and more particularly, to illuminating indicators.

In the prior art, various types of illuminating indicators have been utilized to indicate the selected operating mode in an automatic transmission. An important functional feature of these types of indicators is that the indication of the selected operating mode be prominent and distinct so that a vehicle operator can readily identify the currently selected gear. In general, several of the prior art devices are effective for this purpose. However, the inventors herein have recognized that the presently known devices are not entirely satisfactory and, in fact, include some inherent disadvantages.

For example, U.S. Pat. No. 5,398,018 and its parent case U.S. Pat. No. 5,245,313 disclose two embodiments of an automatic transmission lever position indicating device. In one embodiment, the device includes incandescent bulbs which generally illuminate a sequence of translucent characters corresponding to the sequence of positions of the shift lever. The additional indication of the selected mode is then provided via a separate relatively small concentrated translucent area associated with each translucent character. A light emitting diode (LED) is confined to each concentrated translucent and illuminates the associated translucent area when the corresponding operating mode is selected.

A disadvantage of the above embodiment is that two independent translucent areas are employed to provide the distinct indication of the selected mode. Accordingly, package size is not minimized.

In the second embodiment disclosed in the two patents cited above, the incandescent bulbs and additional concentrated translucent areas are eliminated. Instead, each translucent character has an associated LED. General illumination of the device is provided by illuminating all of the LEDs at a lower intensity except for the LED associated with the selected mode which is illuminated with a higher intensity to provide the additional indication.

A disadvantage of this second embodiment is that the device is limited to providing a single color indication, albeit at varying intensities, at each translucent character. While the indication may be prominent it is not entirely distinct. An alternative may be provided by using available dual color LEDs. However, such LEDs are typically prohibitively expensive and tend to loose lighting efficiency.

Accordingly, a need exists for an illuminating indicating apparatus which provides packaging and cost advantages without sacrificing a truly prominent and distinct indication.

SUMMARY OF THE INVENTION

An object of the invention described herein is to provide a prominent and distinct indication in an illuminating indicator. A further object is to provide the prominent and distinct indication with a minimum of package space and cost.

The above objects are achieved, and problems of prior art approaches overcome, by providing an illuminating indicating apparatus comprising: an indication area; a first compartment communicating with the indication area, a first light source disposed in the first compartment, a second compartment communicating with the first compartment through a light filter, and a second light source disposed in the second compartment for providing filtered light to the first compartment.

An advantage of the above aspect of the invention is that package size and cost are decreased without sacrificing a truly prominent and distinct indication within a general lighting theme. Accordingly, the present invention may be used to particular advantage for indicating a selected operating mode from among a number of selectable operating modes in an automatic transmission.

BRIEF DESCRIPTION OF THE DRAWING

The above object and advantages of the invention will be more clearly understood by reading an example of a preferred embodiment in which the invention is used to advantage with reference to the attached drawings wherein like numerals refer to like parts and wherein:

FIG. 1 is a schematic representation of a system in which an embodiment of the invention is used to advantage;

FIG. 2 is a front planar view of the embodiment shown in FIG. 1 with the appliqué removed for purposes of clear illustration;

FIG. 3 is a front planar view of the embodiment shown in FIG. 1; and

FIG. 4 is a sectional view taken along the line of 4—4 of FIG. 3.

DETAILED DESCRIPTION OF THE INVENTION

Referring first to FIG. 1, for illustrative purposes, indicator 10 is shown associated with transmission position sensor 12. Transmission position sensor 12 of the present embodiment is Ford Part No. F5DP-7F29-AA which is essentially a 6-position rotary switch wherein wiper 14 is mechanically linked to a transmission gear selector (not shown) in a conventional manner. Each of the six switch positions corresponds to one of the selectable operating modes of an automatic transmission. For example, as shown in FIG. 1, switch position 16 corresponds to park (P), switch position 18 corresponds to reverse (R), switch position 20 corresponds to neutral (N), and switch positions 22, 24 and 26 correspond to the three forward moving gears (D, 2 and 1) respectively. Obviously the number of switch positions depends on the number of selectable modes available in the particular transmission and can be modified accordingly.

Wiper arm 14 is also electrically coupled to a source of battery voltage $V_{BATT}$, such as a conventional vehicle battery (not shown), which typically provides a voltage in the range of 12 to 14 volts. Accordingly, as the operator manually operates the transmission gear selector, wiper arm 14 rotates through the various transmission positions to provide an indication signal to indicator 10 by coupling battery voltage $V_{BATT}$ to an associated indicator light source as will be described in greater detail later herein.

While transmission position sensor 12 is a rotary switch in the present example, obviously other types of sensors could be utilized instead. For example, a known digital transmission sensor that provides a 4-bit word indicative of the selected mode could alternatively be used in combination with a conventional decoder for driving the indicator light sources. Also, a conventional ignition switch (not shown) may be advantageously coupled between the source of battery voltage $V_{BATT}$ and transmission position sensor 12 to provide power only when the ignition switch is closed.

Continuing with FIG. 1, indicator 10 is also shown associated with pulse width modulation (PWM) module 28. In the present embodiment, PWM module 28 is Ford Part No. F6DB-11654-XX which provides an illumination signal to indicator 10 for controlling the intensity of the display. In the present example, PWM module 28 generates the illumination signal as a fixed frequency square wave whose amplitude transitions between ground and battery voltage $V_{BATT}$ during a low ambient condition. The duty cycle is set by PWM module 28 between 0 and 100% (on/off) in response to the position of conventional indicator lighting dimmer 30. While dimmer switch 30 is shown as a potentiometer in FIG. 1, certainly other types of switches and dimming schemes known in the automotive arts could alternatively be used. Preferably, PWM module 28 is also coupled to conventional headlamp switch 31 for determining when to generate the illumination signal. For example, a low ambient light condition is defined when headlamp switch 31 is closed so the vehicle headlamps are on. Alternatively, a high ambient light condition is defined when headlamp switch 31 is opened such that the headlamps are off. If the vehicle has daytime running lights or automatic headlamps such that the operator is not manually operating headlamp switch 31, preferably PWM module 28 is still provided with a signal indicative of when a low ambient light condition exists and general illumination of indicator 10 is desired. By coupling PWM module 28 to headlamp switch 31 and dimmer 30, indicator 10 is provided with a dimming feature which will be described later herein.

Switch positions 16–26 of transmission position sensor 12 couple to respective indicator light sources such as amber light emitting diodes (LEDs) 32, 34, 36, 38, 40 and 42 via wires 44, 46, 48, 50, 52 and 54, respectively. Other types of light sources such as incandescent bulbs may be used instead of the indicator LEDs shown. However, the more directional light emitted by the LEDs is preferable.

Blocking diode 55 is preferably included to protect indicator LED 34 if a low impedance load, such as reverse vehicle lamps or chimes, are also connected to switch position 18. Diode 55 protects indicator LED 34 by blocking a reverse current path. Additional blocking diodes could be used to provide similar protection for the remaining indicator LEDs if necessary.

PWM module 28 couples the illumination signal to a general illumination light source, provided in the present example by incandescent bulbs 56, 58 and 60 which are connected in series, and indicator intensity control circuit 62 via wire 64. A ground connection for indicator 10 is provided through wire 66. In the preferred embodiment wires 44 through 54, 64 and 66 are contained in flexible ribbon 68 which allows indicator 10 to be placed in a convenient viewing location separate from transmission position sensor 12 and PWM module 28. For example, in the preferred embodiment indicator 10 is mounted in the vehicle instrument panel.

Referring now to FIG. 2, housing 70 of indicator 10 in the present example is made of molded plastic and has a rectangular portion defined by top 72, sides 74 and 76, bottom 78 and back 80. Indicator compartments 82, 84, 86, 88, 90 and 92 are formed by separating walls 94, 96, 98, 100 and 102 which extend downwardly from top 72 and outwardly from back 80. The number of indicator compartments formed in the housing for a given application will depend on the desired number of indicator lights.

Illumination compartment 104 communicates with each indicator compartment 82–92 through light filter 106 which rests just below separating walls 94–102 on shoulders 108 and 110 and support posts 112 and 114. Preferably, as shown more clearly in FIG. 4, edge 116 of filter 106 rests in channel 118 formed in the back 80 of housing 70. Also in the present embodiment, filter 106 is made of a thin translucent blue/green plastic material.

Returning to FIG. 2, LEDs 32–42 and illumination lamps 56–60 are mounted on a backplane member such as printed wiring board 120 (see also FIGS. 3 and 4). Preferably, indicator LEDs 32–42 are spaced, and associated signal traces on printed wiring board 120 are etched, so that each LED is disposed in its associated indication compartment 82–92 via respective openings 122, 124, 126, 128, 130 and 131 in back 80. Printed wiring board 120 is then held in position by known fastening means such as locking tabs 132 and 133 (see FIG. 4). Illumination lamps 56–60 are similarly mounted on printed wiring board 120 so they are disposed in illumination compartment 104. The various components associated with indicator intensity control circuit 62 may also advantageously be mounted on printed wiring board 120 in areas, such as those designated at 62a and 62b, which will not interfere with indication compartments 82–92 or illumination compartment 104.

Although housing 70 is shown with back surface 80 extending between the separating walls, those skilled in the art will recognize that the back surface of the compartments could alternatively be provided by the printed wiring board 120. Yet another alternative is to extend back 80 to provide a back for illumination compartment 104 as well. Obviously one skilled in the art may envision several other modifications to housing 70 for ease of manufacturing without departing from the scope of the claimed invention.

Continuing with FIG. 2, housing 70 preferably includes means for mounting indicator 10 in its desired viewing location. Mounting flanges 134 and 136 and corresponding screw holes 138 and 140 are provided in the present example for this purpose.

Turning next to FIG. 3, a cover such as appliqué 142 is secured to the front of housing 70. In the present example, appliqué 142 is adhered to the front edges of separating walls 94 through 102, top 72, sides 74 and 76, and bottom 78 with glue. Locating hole 144 and locating slot 146 in appliqué 142 mate with corresponding locating pins 148 and 152 of housing 70 to insure proper alignment of appliqué 142 during manufacturing.

In the present embodiment, appliqué 142 is made of a thin clear translucent polycarbonate film. Black ink is then selectively applied in a conventional manner to the surfaces thereof to create an opaque surface with translucent indication areas or windows 152–162 which communicate with respective indication compartments 82–92. In the embodiment shown, each indication widow 152–162 includes a translucent oval 164–174 encircling a respective unique translucent character P, R, N, D, 2, or 1 which correspond to the selectable transmission operating modes. The unique translucent characters P, R, N, D, 2, and 1 are overlaid with translucent white ink so that when there is sufficient exterior ambient lighting, the characters appear white on a black background. Certainly, various other color combinations of inks may be used.

Returning to FIG. 1, indicator intensity control circuit 62 provides one-step dimming control of indicator LEDs 32–42 in response to the illumination signal generated by PWM module 28. As shown in FIG. 1, indicator intensity control circuit 62 includes constant current drain 176 for drawing a constant current such as 8 milliamps from the vehicle battery to illuminate the indicator LED corresponding to the selected operating mode during a low ambient light condition (i.e., headlamp switch ON).

To draw the constant current, current drain 176 includes zener diode 178 whose cathode connects to the cathodes of each indicator LED 32–42. The anode of zener diode 178 connects to the base of PNP transistor 180. Transistor 180 is biased to operate in its active region by resistor 182 which connects between the collector and base. The collector of transistor 180 may be connected directly to ground. However, as shown in FIG. 1, blocking diode 183 is preferably interposed therebetween to provide reverse battery protection to indicator intensity control circuit 62.

Resistor 184 and the emitter-base junction of transistor 180 are in parallel with zener diode 178. When one of the indicator LEDs is coupled to battery voltage $V_{BATT}$, zener diode 178 operates in its zener region to fix the voltage drop across resistor 184. Accordingly, resistor 184 can be appropriately sized to provide the desired constant current draw (e.g., 8 milliamps) to illuminate the indicator LED. An advantage is thereby provided of eliminating variations in illumination which may otherwise be caused by variations in battery voltage $V_{BATT}$.

Continuing with FIG. 1, indicator intensity control circuit 62 further includes current drain 186 for drawing an additional constant current such as 4 milliamps from the voltage source to illuminate the indicator LED corresponding to the selected operating mode during a high ambient light condition (i.e., headlamp switch OFF).

To draw the additional constant current, current drain 186 includes diode 188 whose anode connects to the cathodes of indicator LEDs 32–42. The cathode of diode 188 connects to the collector of darlington NPN transistor 190. Resistor 192 connects between the collector and base to bias transistor 190 to operate as a switch. The anode of diode 194 connects to the emitter of transistor 190. Resistor 196 provides a current path from the cathode of diode 194 to the emitter of transistor 180.

The voltage drop across resistor 184 of current drain 176 determines the voltage drop across the parallel current path through diode 188, the collector-emitter junction of transistor 190, diode 194, and resistor 196. Moreover, since transistor 190 is operating in saturation, the voltage drop across the collector-emitter junction, $V_{CE}$, is fixed along with the fixed drops across diodes 188 and 194. Accordingly, resistor 196 can be sized to provide the desired amount of additional current draw. An advantage is thereby obtained of providing two levels of intensity at which indicator LEDs 32–42 can be illuminated.

To control the intensity level of the indicator LEDs, indicator intensity control circuit 62 further includes switching circuit 198. Switching circuit 98 is responsive to the illumination signal generated by PWM module 28 for controlling when additional current is drawn by current drain 186. As shown in FIG. 1, switching circuit 198 includes switching transistor 200. The collector of transistor 200 (i.e., the output of switching circuit 198) couples to current drain 186 at the base of transistor 190. Resistor 202 feeds the illumination signal from PWM module 28 to the base of transistor 200. Capacitor 204 is connected in parallel with the base-emitter junction to the anode of blocking diode 183. Together, resistor 202 and capacitor 204 provide filtering to protect the base of transistor 200 from voltage transients.

Capacitor 206 connects between the collector of transistor 200 and anode of blocking diode 183. Capacitor 206 combines with resistor 192 to form an RC network which is designed to provide the desired response time as described below.

In operation, switching circuit 198 detects the presence of the illumination signal generated by PWM module 28. When no illumination signal is present, transistor 200 remains off. With transistor 200 off, the source of battery voltage $V_{BATT}$ charges capacitor 206 through resistor 192. As a result, the voltage present at the base of transistor 190 allows it to turn on. With transistor 190 conducting, both current drains 176 and 186 draw current so that a combined current of 12 milliamps is drawn through the indicator LED corresponding to the selected operating mode.

Alternatively, when an illumination signal is present at the base of transistor 200, transistor 200 modulates between on and off states with the high and low states of the illumination signal. When transistor 200 is on, a discharge path to ground is provided for capacitor 206. Transistor 190 shuts off as the voltage present at its base is pulled to ground. When transistor 200 switches back off, capacitor 206 once again begins to charge through resistor 192.

In the present example, the RC network formed by resistor 192 and capacitor 206 is designed to prevent capacitor 206 from charging to a potential during a high state of the illumination signal which would allow transistor 190 to conduct. Accordingly, whenever an illumination signal is generated by PWM module 28, additional current drain 186 is off so that the current draw through the indicator LED associated with the selected operating mode is reduced to 8 milliamps. This in turn reduces the intensity of the illuminated indicator LED. An advantage is thereby obtained of providing one-step dimming of the indicator light sources. Obviously, the relative intensities between the two modes can be set by adjusting resistors 184 and 196 as described above.

From the above description, it is apparent that indicator 10 operates in generally two distinct modes: a high ambient mode when no illumination signal is generated by PWM module 28, and a low ambient mode when an illumination signal is generated by PWM module 28.

During the high ambient mode, 12 milliamps of current is drawn through the indicator LED corresponding to the selected transmission operating mode to illuminate its associated indication window at a first intensity. And, with no illuminating signal present, illumination lamps 56–60 remain off. Accordingly, the selected position appears to the driver as an amber oval encircling an amber character while the remaining positions appear first surface white.

During the low ambient mode, the indicator LED corresponding to the selected transmission operating mode draws 8 milliamps of current to illuminate its associated indication window at a second reduced intensity relative to the first intensity. Moreover, because an illumination signal is present, illumination lamps 56–60 are lit at an intensity dependent upon the duty cycle of the illumination signal generated by PWM module 28. An advantage is thereby obtained of controlling the intensity illumination lamps 50–60 independent of the intensity of indicator LEDs 32–42. A further advantage is that the general illumination of indicator 10 is continuously variable and controllable by the driver via dimmer 30 while the intensity of the indicator remains constant during the low ambient mode.

Light emitting from illumination lamps 56–60 in illumination compartment 104 passes through filter 106 to fill indication compartments 82–92 with blue/green light. Light emitting from the selected positions indicator LED combines with the filtered light present in the associated indicator compartment. The relative intensities of the indicator LED and the filtered light present in the indication compartment are preferably designed so that the amber light emitting from the selected indicator LED overpowers the blue/green light present in the compartment. Accordingly, the indication area associated with the selected position appears to the driver as an amber oval encircling an amber character while the remaining indication areas appear as a blue/green oval encircling a blue/green character. Therefore, as the gear selector is moved by the operator, the blue/green color appears to turn off as the amber color appears to turn on at each position the selector is moved to while the remaining unselected positions appear continuously blue/green in color.

Obviously one skilled in the art may achieve color combinations by modifying the presently described embodiment in a number of ways. For example, the translucent film used to make appliqué 142 may be colored rather than clear. Alternatively, dual colored LEDs or multiple filters could be used. Regardless, an advantage of the present invention is that versatility is provided for creating a desired lighting theme.

This concludes the description of a preferred embodiment. The reading of it by those skilled in the art will bring to mind many alterations and modifications beyond those already suggested above without departing from the spirit and scope of the invention. For example, other embodiments of indicator intensity control circuit 62 may use other components, such as dedicated integrated circuit, to provide similar functionality. Alternatively, digital components may be employed.

It is also important to note that while the exemplary embodiment has been described in the context of a indicating the selected operating mode in an automatic transmission, the invention is not so limited. Rather, the inventors herein envision use of the present invention in a variety of automotive and non-automotive uses. For example, the device is not limited to lighting only one indicator light at a time. Obviously for transmission indication this is desirable. Accordingly, it is intended that the scope of the invention be limited to only the following claims.

What is claimed:

1. An illuminating indicating apparatus for an automatic transmission gear selector in an automotive vehicle comprising:
    a backlit indication area for displaying a representation of each of the selectable gear positions;
    a plurality of first compartments respectively corresponding to each said display representation;
    a first light source disposed in each of said first compartments for providing backlight indication to said corresponding selected display representation in said indication area;
    a second compartment communicating with said plurality of first compartments; and
    a second light source disposed in said second compartment for providing backlight illumination to said plurality of first compartments, wherein each selected first light source provides a backlight indication that is perceptibly different from the backlight illumination of said second light source.

2. An illuminating indicating apparatus as in claim 1, wherein a colored light filter is located between said second light source and said first compartments.

3. An illuminating indicating apparatus as in claim 1, further including circuit means connected to said first and second light sources to energize only a selected first light source when said vehicle is in operation and additionally to energize said second light source when said vehicle is in operation in low ambient lighting conditions.

4. An illuminating indicating apparatus as in claim 1, wherein the light provided by a selected first light source is dominantly perceptible over the light provided by said second light source.

5. An illuminating indicating apparatus as in claim 4, wherein the light provided from a selected first light source is perceived as both a different color and greater intensity than light provided by said second light source.

* * * * *